US012693531B2

(12) United States Patent
Minami et al.

(10) Patent No.: US 12,693,531 B2
(45) Date of Patent: Jul. 28, 2026

(54) HEAD-UP DISPLAY SYSTEM

(71) Applicant: Panasonic Intellectual Property Management Co., Ltd., Osaka (JP)

(72) Inventors: Kazuhiro Minami, Osaka (JP); Satoshi Kuzuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 344 days.

(21) Appl. No.: 18/236,506

(22) Filed: Aug. 22, 2023

(65) Prior Publication Data

US 2023/0393392 A1 Dec. 7, 2023

Related U.S. Application Data

(63) Continuation of application No. PCT/JP2021/040066, filed on Oct. 29, 2021.

(30) Foreign Application Priority Data

Feb. 26, 2021 (JP) ................................. 2021-031016

(51) Int. Cl.
G02B 27/01 (2006.01)
B60K 35/10 (2024.01)
(Continued)

(52) U.S. Cl.
CPC .......... G02B 27/0101 (2013.01); B60K 35/10 (2024.01); B60K 35/231 (2024.01);
(Continued)

(58) Field of Classification Search
CPC ......................... G02B 27/0101; G02B 6/0016; G02B 6/0038; G02B 27/0081; G02B 27/1086;
(Continued)

(56) References Cited

U.S. PATENT DOCUMENTS 10,429,645 B2 10/2019 Vallius
2012/0127577 A1* 5/2012 Desserouer ........ G02B 27/0101
359/566

(Continued)

FOREIGN PATENT DOCUMENTS

CN 112346251 2/2021
WO 2018/198587 11/2018
WO 2022/057983 3/2022

OTHER PUBLICATIONS

Office Action issued Jun. 10, 2025 in Japanese Patent Application No. 2023-502061, with English-language Translation.
(Continued)

*Primary Examiner* — Thomas K Pham
*Assistant Examiner* — Kuei-Jen L Edenfield
(74) *Attorney, Agent, or Firm* — Wenderoth, Lind & Ponack, L.L.P.

(57) ABSTRACT

A head-up display system includes a display that emits a light flux and a light guide body that guides the light flux to the light-transmitting member. A light beam at a center of the light flux emitted from the display is incident while being inclined with respect to a normal direction of the incident surface of the light guide body. The light flux incident on the incident surface of the light guide body is changed in a traveling direction in the light guide body, the light flux is replicated into a plurality of light fluxes in a horizontal direction of the virtual image, and then the replicated light fluxes are further replicated in a vertical direction of the virtual image to be emitted from the emission surface so as to expand the visual recognition region. A light beam at a center of the light fluxes emitted from the light guide body is emitted toward the light-transmitting member while being inclined with respect to a normal direction of the emission surface of the light guide body.

20 Claims, 15 Drawing Sheets

(51) Int. Cl.

| | |
|---|---|
| *B60K 35/231* | (2024.01) |
| *B60K 35/60* | (2024.01) |
| *B60K 35/81* | (2024.01) |
| *F21V 8/00* | (2006.01) |
| *G02B 27/00* | (2006.01) |
| *G02B 27/10* | (2006.01) |

(52) U.S. Cl.
CPC .............. *B60K 35/60* (2024.01); *B60K 35/81* (2024.01); *G02B 6/0016* (2013.01); *G02B 6/0038* (2013.01); *G02B 27/0081* (2013.01); *G02B 27/1086* (2013.01); *G02B 2027/013* (2013.01); *G02B 2027/0196* (2013.01)

(58) Field of Classification Search
CPC ...... G02B 2027/013; G02B 2027/0196; G02B 27/01; G02B 27/00; G02B 27/10; G02B 27/0103; G02B 2027/0181; G02B 2027/0183; B60K 35/10; B60K 35/231; B60K 35/60; B60K 35/81; B60K 35/23; B60K 2360/334; B60K 2360/336; F21V 8/00
USPC ............. 359/521, 13–14, 629–633, 558–576
See application file for complete search history.

(56) References Cited

U.S. PATENT DOCUMENTS

| | | | | |
|---|---|---|---|---|
| 2016/0252742 A1* | 9/2016 | Wakabayashi | ....... | G02B 26/085 |
| | | | | 345/8 |
| 2020/0026074 A1 | 1/2020 | Waldern et al. | | |
| 2020/0057307 A1 | 2/2020 | Yoshikaie | | |
| 2020/0264429 A1* | 8/2020 | Damamme | ........ | G02B 27/0172 |
| 2023/0341680 A1 | 10/2023 | Wille et al. | | |

OTHER PUBLICATIONS

English translation of International Preliminary Report on Patentability and Written Opinion issued Aug. 29, 2023 in corresponding International (PCT) Patent Application No. PCT/JP2021/040066.
Extended European Search Report issued Jul. 17, 2024 in European Patent Application No. 21928028.6.
International Search Report issued Jan. 18, 2022 in International (PCT) Application No. PCT/JP2021/040066.
Office Action issued May 19, 2026 in corresponding Chinese patent application No. 202180094584.1, with English translation of search report, 11 pages.

* cited by examiner

HEAD-UP DISPLAY SYSTEM

CROSS-REFERENCE TO RELATED APPLICATIONS

This is a continuation application of International Application No. PCT/JP2021/040066, with an international filing date of Oct. 29, 2021, which claims priority of Japanese Patent Application No. 2021-031016 filed on Feb. 26, 2021, the content of which is incorporated herein by reference.

BACKGROUND

Technical Field

The present disclosure relates to a head-up display system that displays a virtual image.

Background Art

Conventionally, a vehicle information projection system that performs augmented reality (AR) display using a head-up display has been disclosed. For example, the head-up display projects light representing a virtual image on a windshield of a vehicle to allow a driver to visually recognize the virtual image together with a real view of an outside world of the vehicle.

As a device for displaying a virtual image, U.S. Pat. No. 10,429,645 describes an optical element including a waveguide (light guide body) for expanding an exit pupil in two directions. The optical element may utilize a diffractive optical element to expand the exit pupil. In addition, WO 2018/198587 A describes ahead-mounted display that performs augmented reality (AR) display using a volume hologram diffraction grating.

SUMMARY

However, when a pupil expansion type hologram used for a head-mounted display is implemented by a head-up display, fine processing is required for a light guide body, and it is difficult to manufacture the light guide body.

The present disclosure provides a head-up display system that facilitates manufacturing of a light guide body.

A head-up display system of the present disclosure is a head-up display system that displays a virtual image so as to be superimposed on a real view visually recognizable through a light-transmitting member, and includes: a display that emits a light flux visually recognized by an observer as the virtual image; and a light guide body that guides the light flux to the light-transmitting member. The light guide body includes an incident surface on which the light flux from the display is incident and an emission surface from which the light flux is emitted from the light guide body. A light beam at a center of the light flux emitted from the display is incident while being inclined with respect to a normal direction of the incident surface of the incident surface of the light guide body. When a direction in which the observer visually recognizes the virtual image from a visual recognition region of the virtual image is a Z-axis direction, a horizontal direction orthogonal to the Z-axis is an X-axis direction, and a direction orthogonal to an XZ plane formed by the X-axis and the Z-axis is a Y-axis direction, the light flux incident on the incident surface of the light guide body and changed in a traveling direction is replicated into a plurality of light fluxes in a horizontal direction of the virtual image visually recognized by the observer, and then the replicated light fluxes are further replicated in a vertical direction of the virtual image to be emitted from the emission surface so as to expand the visual recognition region. A light beam at a center of the light fluxes emitted from the light guide body is emitted toward the light-transmitting member while being inclined with respect to a normal direction of the emission surface of the light guide body. The light guide body is inclined with respect to the Z-axis in a cross-sectional view of a YZ plane formed by the Y-axis and the Z-axis, and the light guide body is disposed so as to be inclined with respect to the light-transmitting member in a cross-sectional view of the YZ plane. A light flux emitted from the light guide body is incident on the light-transmitting member so as to be inclined with respect to the Z-axis in a cross-sectional view of the YZ plane.

A head-up display system of the present disclosure is a head-up display system that displays a virtual image so as to be superimposed on a real view visually recognizable through a light-transmitting member, and includes: a display that emits a light flux visually recognized by an observer as the virtual image; and a light guide body that guides the light flux to the light-transmitting member. The light guide body includes an incident surface on which the light flux from the display is incident, a coupling region that changes a traveling direction of the light flux incident on the incident surface, a first expansion region that expands a visual recognition region by replicating the light flux propagated from the coupling region into a plurality of light fluxes in a first direction, a second expansion region that expands the visual recognition region by replicating the light fluxes replicated in the first expansion region in a second direction intersecting the first direction, and an emission surface from which the light fluxes replicated in the second expansion region are emitted. A light beam at a center of the light flux emitted from the display is incident while being inclined with respect to a normal direction of the incident surface of the light guide body. When a direction in which the observer visually recognizes the virtual image from the visual recognition region of the virtual image is a Z-axis direction, a horizontal direction orthogonal to the Z-axis is an X-axis direction, and a direction orthogonal to an XZ plane formed by the X-axis and the Z-axis is a Y-axis direction, in the light guide body, the light flux incident on the coupling region and changed in the traveling direction propagates to the first expansion region, is replicated in the first direction that is the horizontal direction, and propagates to the second expansion region. The light flux is replicated in the second direction in the second expansion region and is emitted from the emission surface, and a light beam at a center of the light flux emitted from the light guide body is emitted toward the light-transmitting member while being inclined with respect to a normal direction of the emission surface of the light guide body. The light guide body is inclined with respect to the Z-axis in a cross-sectional view of a YZ plane formed by the Y-axis and the Z-axis, and the light guide body is disposed so as to be inclined with respect to the light-transmitting member in a cross-sectional view of the YZ plane. A light flux emitted from the light guide body is incident on the light-transmitting member so as to be inclined with respect to the Z-axis in a cross-sectional view of the YZ plane.

According to the head-up display system of the present disclosure, the light guide body can be easily manufactured.

DETAILED DESCRIPTION

Outline of Present Disclosure

Figure 1:
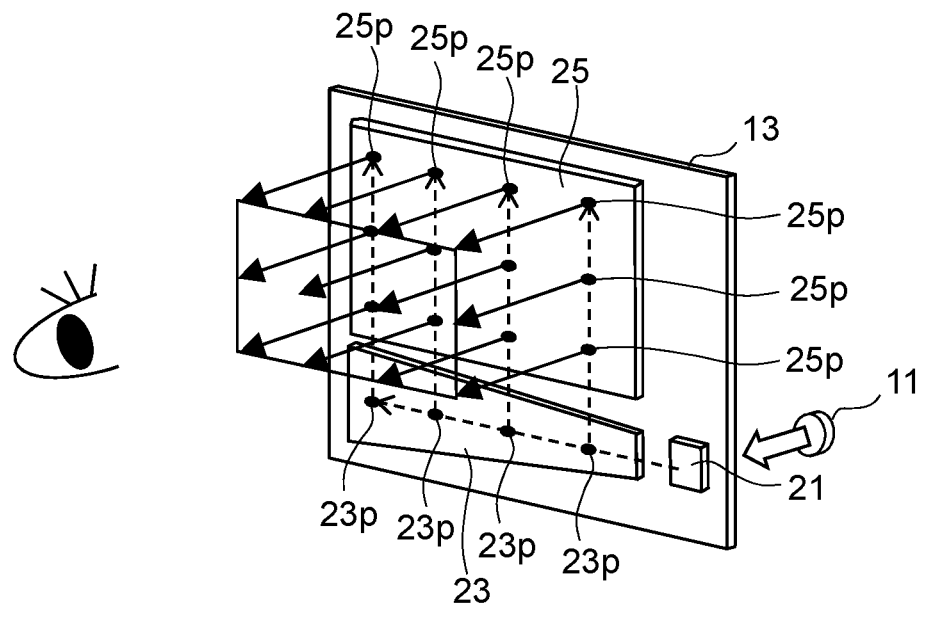
FIG. 1 is a schematic perspective view illustrating a configuration of a light guide body.

First, an outline of the present disclosure will be described with reference to FIG. 1. FIG. 1 is a schematic view illustrating a configuration of a light guide body 13. A so-called pupil expansion type light guide body 13 is used in a head-mounted display (hereinafter, referred to as an HMD) or the like. The pupil expansion type light guide body 13 includes a coupling region 21 where image light from a display 11 is incident to change a traveling direction, a first expansion region 23 that expands in a first direction, and a second expansion region 25 that expands in a second direction. The first direction and the second direction may intersect each other, for example, may be orthogonal.

The coupling region 21, the first expansion region 23, and the second expansion region 25 each have diffraction power for diffracting image light, and an embossed hologram or a volume hologram is formed. The embossed hologram is, for example, a diffraction grating. The volume hologram is, for example, an interference fringe by a dielectric film. The coupling region 21 changes the traveling direction of the image light incident from the outside to the first expansion region 23 by the diffraction power.

In the first expansion region 23, for example, diffraction grating elements are disposed, and image light is replicated by dividing the incident image light into image light traveling in the first direction and image light traveling to the second expansion region 25 by diffraction power. For example, in FIG. 1, in the first expansion region 23, the diffraction grating elements are disposed at four points 23p arranged in a direction in which the image light travels by repeating total reflection. The diffraction grating element divides the image light at each point 23p, and advances the divided image light to the second expansion region 25. As a result, the light flux of the incident image light is replicated into the light fluxes of the four image light beams in the first direction to be expanded.

In the second expansion region 25, for example, diffraction grating elements are disposed, and image light is replicated by dividing the incident image light into image light traveling in the second direction and image light emitted from the second expansion region 25 to the outside by diffraction power. For example, in FIG. 1, three points 25p arranged in a direction in which the image light travels by repeating total reflection are disposed per row in the second expansion region 25, and diffraction grating elements are disposed at a total of 12 points 25p in four rows. The image light is divided at each point 25p, and the divided image light is emitted to the outside. As a result, the light fluxes of the image light incident in the four rows are respectively replicated into the light fluxes of the three image light beams in the second direction to be expanded. In this way, the light guide body 13 can replicate one incident light flux of the image light into the 12 light fluxes of the image light, and can replicate the light flux in the first direction and the second direction, respectively, to expand the visual recognition region. From the 12 light fluxes of the image light, an observer can visually recognize the light fluxes of the respective image light beams as a virtual image, and the visual recognition region where the observer can visually recognize the image light can be widened.

Figure 2:
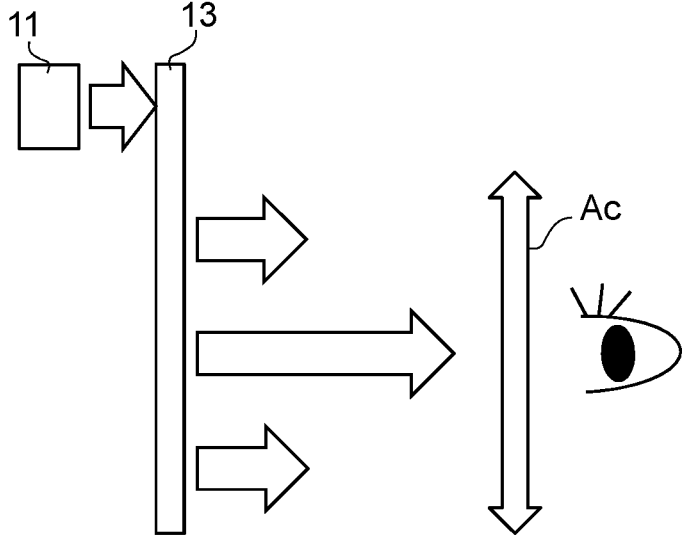
FIG. 2 is an explanatory view illustrating directions of incident light and emission light to the light guide body of a head-mounted display.
Figure 3:
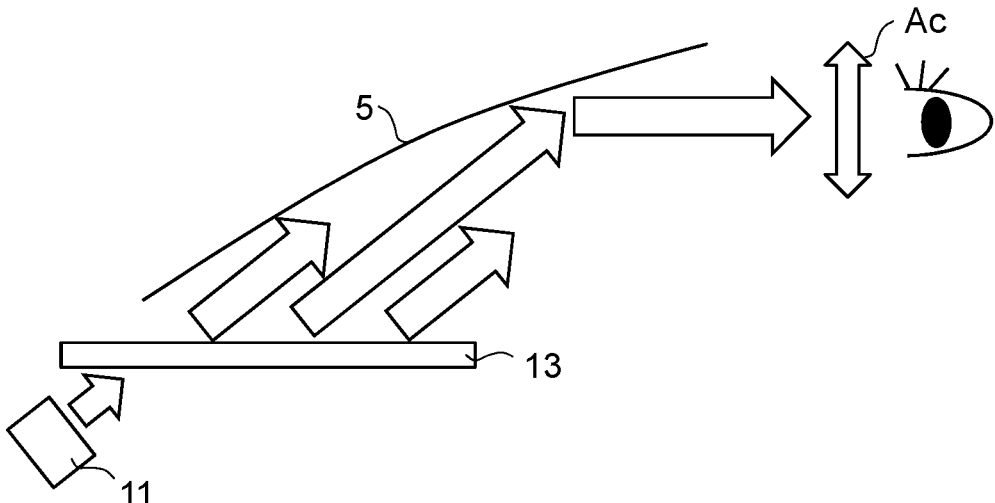
FIG. 3 is an explanatory view illustrating directions of incident light and emission light to the light guide body of the head-up display.

Next, a difference between a pupil expansion type HMD and a head-up display (hereinafter, referred to as an HUD) will be described with reference to FIGS. 2 and 3. FIG. 2 is an explanatory view illustrating incident light and emission light of the HMD. FIG. 3 is an explanatory view illustrating incident light and emission light of the HUD.

As illustrated in FIG. 2, the light guide body 13 in the HMD substantially faces a visual recognition region Ac where the observer can view a virtual image. The image light vertically incident from the display 11 is divided in the light guide body 13, and the divided image light is vertically emitted from an emission surface of the light guide body 13 toward the visual recognition region Ac.

On the other hand, as illustrated in FIG. 3, in the case of the HUD, the image light emitted from the light guide body 13 is reflected by, for example, a windshield 5 to be incident on the visual recognition region Ac, so that the divided image light is emitted in an oblique direction from the emission surface of the light guide body 13. In this case, the inventors have newly found that optical design can be facilitated by causing the image light from the display 11 to be incident in the oblique direction on the light guide body 13. As described above, the inventors have newly found that the HMD and the HUD have different directions of images emitted from the light guide body 13, and the HUD can be easily manufactured by utilizing this characteristic. Hereinafter, the configuration of the present disclosure will be further described.

Embodiment

Figure 5:
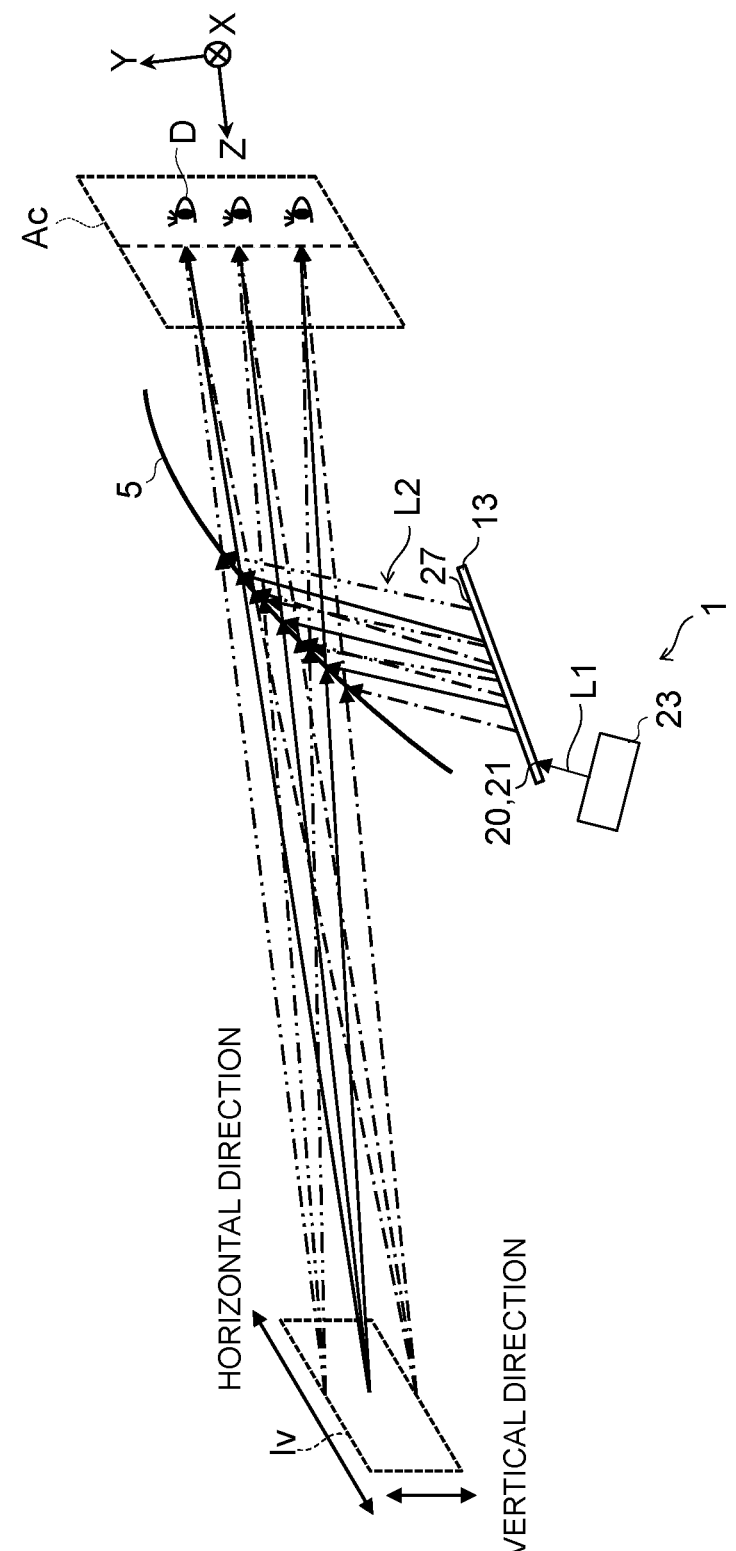
FIG. 5 is an explanatory view illustrating an optical path of a light flux emitted from a display.
Figure 6:
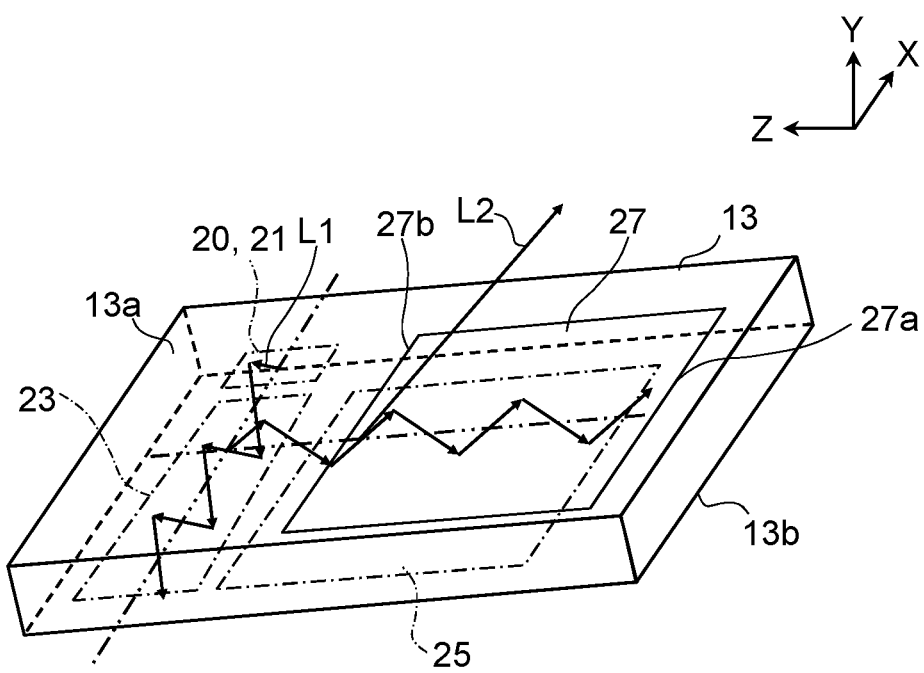
FIG. 6 is a see-through perspective view illustrating a configuration of the light guide body.

Hereinafter, an embodiment will be described with reference to FIGS. 4 to 6. Note that components having functions common to those of the above-described components are denoted by the same reference numerals. In addition, the inclination angles of the windshield in the drawings are illustrated for easy understanding, and thus may vary depending on the drawings.

1-1. Configuration

1-1-1. Overall Configuration of Head-Up Display System

A specific embodiment of a head-up display system 1 (hereinafter, referred to as an HUD system 1) of the present disclosure will be described. FIG. 4 is a view illustrating a cross section of a vehicle 3 on which the HUD system 1 according to the present disclosure is mounted. FIG. 5 is an explanatory view illustrating an optical path of a light flux emitted from the display. In the embodiment, the HUD system 1 mounted on the vehicle 3 will be described as an example. Hereinafter, directions related to the HUD system 1 will be described based on the X-axis, the Y-axis, and the Z-axis illustrated in FIG. 4. The Z-axis direction is a direction in which an observer visually recognizes a virtual image Iv from the visual recognition region Ac where the observer can visually recognize the virtual image Iv. The X-axis direction is a horizontal direction orthogonal to the Z-axis. The Y-axis direction is a direction orthogonal to an XZ plane formed by the X-axis and the Z-axis. Therefore, the X-axis direction corresponds to the horizontal direction of the vehicle 3, the Y-axis direction corresponds to the vertical direction of the vehicle 3, and the Z-axis direction corresponds to the forward direction of the vehicle 3.

Figure 4:
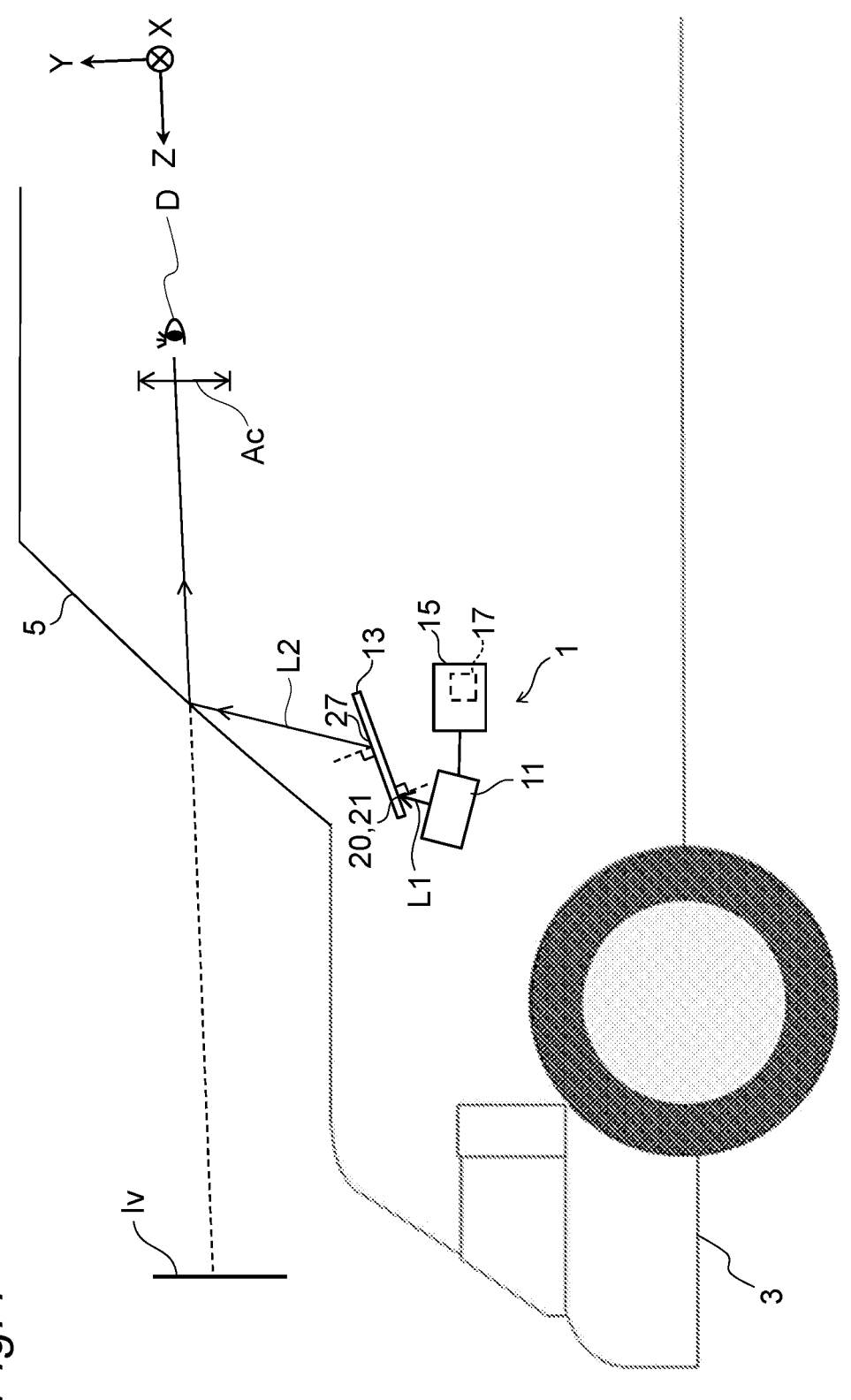
FIG. 4 is a YZ plane cross-sectional view of a vehicle on which a head-up display system of an embodiment is mounted.

As illustrated in FIG. 4, the HUD system 1 is disposed inside a dashboard (not illustrated) below the windshield 5 of the vehicle 3. An observer D recognizes an image projected from the HUD system 1 as the virtual image Iv. In this manner, the HUD system 1 displays the virtual image Iv so as to be superimposed on a real view visually recognizable through the windshield 5. Since a plurality of replicated images is projected onto the visual recognition region Ac, a hologram displayed as an image can be visually recognized in the visual recognition region Ac even if the eye position of the observer is shifted in the Y-axis direction and the X-axis direction. The observer D is a human in the vehicle 3 as a moving body, and is, for example, a driver.

The HUD system 1 includes the display 11, the light guide body 13, and a controller 15. The display 11 displays an image to be displayed as the virtual image Iv. The light guide body 13 divides and replicates a light flux L1 emitted from the display 11, and guides the replicated light flux L2 to the windshield 5.

The display 11 displays an image based on control by an external controller. As the display 11, for example, a liquid crystal display with a backlight, an organic light-emitting diode, a plasma display, or the like can be used. In addition, as the display 11, an image may be generated using a screen that diffuses or reflects light and a projector or a scanning laser. The display 11 can display image content including various types of information such as a road guidance display, a distance to a vehicle ahead, a remaining battery level of the vehicle, and a current vehicle speed. As described above, the display 11 emits the light flux L1 including the image content visually recognized by the observer D as the virtual image Iv.

The controller 15 can be implemented by a semiconductor element or the like. The controller 15 can be configured by, for example, a microcomputer, a CPU, an MPU, a GPU, a DSP, an FPGA, or an ASIC. The controller 15 reads data and programs stored in a built-in memory (not illustrated) and performs various arithmetic processing, thereby implementing a predetermined function. Furthermore, the controller 15 includes a storage 17.

The storage 17 is a storage medium that stores programs and data necessary for implementing the functions of the controller 15. The storage 17 can be implemented by, for example, a hard disk (HDD), an SSD, a RAM, a DRAM, a ferroelectric memory, a flash memory, a magnetic disk, or a combination thereof. The storage 17 stores a plurality of pieces of image data representing the virtual image Iv. The controller 15 determines the virtual image Iv to be displayed based on vehicle-related information acquired from the outside. The controller 15 reads the image data of the determined virtual image Iv from the storage and outputs the image data to the display 11.

1-1-2. Light Guide Body

A configuration of the light guide body 13 will be described with reference to FIG. 6. FIG. 6 is a see-through perspective view illustrating a configuration of the light guide body 13. The light guide body 13 has a first main surface 13a and a second main surface 13b. The first main surface 13a and the second main surface 13b face each other. The light guide body 13 includes an incident surface 20, a coupling region 21, a first expansion region 23, a second expansion region 25, and an emission surface 27. The incident surface 20, the coupling region 21, the first expansion region 23, and the second expansion region 25 are included in the second main surface 13b, and the emission surface 27 is included in the first main surface 13a. The emission surface 27 faces the second expansion region 25. Note that the coupling region 21, the first expansion region 23, and the second expansion region 25 may exist between the first main surface 13a and the second main surface 13b. The first main surface 13a faces the windshield 5. In the present embodiment, the incident surface 20 is included in the coupling region 21, but may be included in the first main surface 13a which is a surface facing the coupling region 21. The emission surface 27 may be included in the second expansion region 25.

The coupling region 21, the first expansion region 23, and the second expansion region 25 have different diffraction powers, and a diffraction grating or a volume hologram is formed in each region. The coupling region 21, the first expansion region 23, and the second expansion region 25 have different diffraction angles of image light. In addition, the light guide body 13 has a configuration in which the incident light flux is totally reflected inside. As such, the light guide body 13 includes a diffraction grating or a volume hologram that diffracts light in part. The coupling region 21, the first expansion region 23, and the second expansion region 25 are three-dimensional regions in a case where a volume hologram is included.

The coupling region 21 is a region where the light flux L1 emitted from the display 11 is incident from the incident surface 20 and the traveling direction of the light flux L1 is changed. The coupling region 21 has diffraction power and changes the propagation direction of the incident light flux L1 to the direction of the first expansion region 23. In the present embodiment, coupling is a state of propagating in the light guide body 13 under the total reflection condition.

The first expansion region 23 expands the light flux L1 in the first direction and emits the light flux L1 to the second expansion region. In the first expansion region 23 expanding the light flux L1 in the first direction, the length in the first direction is larger than the length in the second direction. The light guide body 13 is disposed such that the first direction is the horizontal direction (X-axis direction). The light flux L1 propagated from the coupling region 21 is propagated in the first direction while repeating total reflection on the first main surface 13a and the second main surface 13b, and the light flux L1 is replicated by the diffraction grating of the first expansion region 23 formed on the second main surface 13b and emitted to the second expansion region.

The second expansion region 25 expands the light flux L1 in the second direction perpendicular to the first direction, for example, and emits the expanded light flux L2 from the emission surface 27. The light guide body 13 is disposed such that the second direction is the Z-axis direction. The light flux L1 propagated from the first expansion region 23 is propagated in the second direction while repeating total reflection on the first main surface 13a and the second main surface 13b, and the light flux L1 is replicated by the diffraction grating of the second expansion region 25 formed on the second main surface 13b and emitted to the outside of the light guide body 13 via the emission surface 27.

Therefore, when viewed from the viewpoint of the observer D, the light guide body 13 expands the light flux L1 incident on the incident surface 20 and changed in the traveling direction in the horizontal direction (X-axis direction) of the virtual image Iv visually recognized by the observer D, and then further expands the light flux L1 in the vertical direction (Y-axis direction) of the virtual image Iv to emit the light flux L2 from the emission surface 27.

FIG. 4 will be referred to. The light guide body 13 is inclined with respect to the Z-axis in a cross-sectional view of a YZ plane formed by the Y-axis and the Z-axis. The light beam at the center of the light flux L1 emitted from the display 11 is incident while being inclined with respect to the normal direction of the incident surface 20 of the coupling region 21 of the light guide body 13. The light beam at the center of the light flux L1 emitted from the display 11 is incident while being inclined with respect to the normal direction of the center or the center of gravity of the incident surface 20, for example. The light beam at the center of the light flux L2 emitted from the light guide body 13 is emitted toward the windshield 5 while being inclined with respect to the normal direction of the emission surface 27 of the light guide body 13. The light beam at the center of the light flux L2 emitted from the light guide body 13 is emitted toward the windshield 5 while being inclined with respect to the normal direction of the center or the center of gravity of the emission surface 27, for example.

Figure 7:
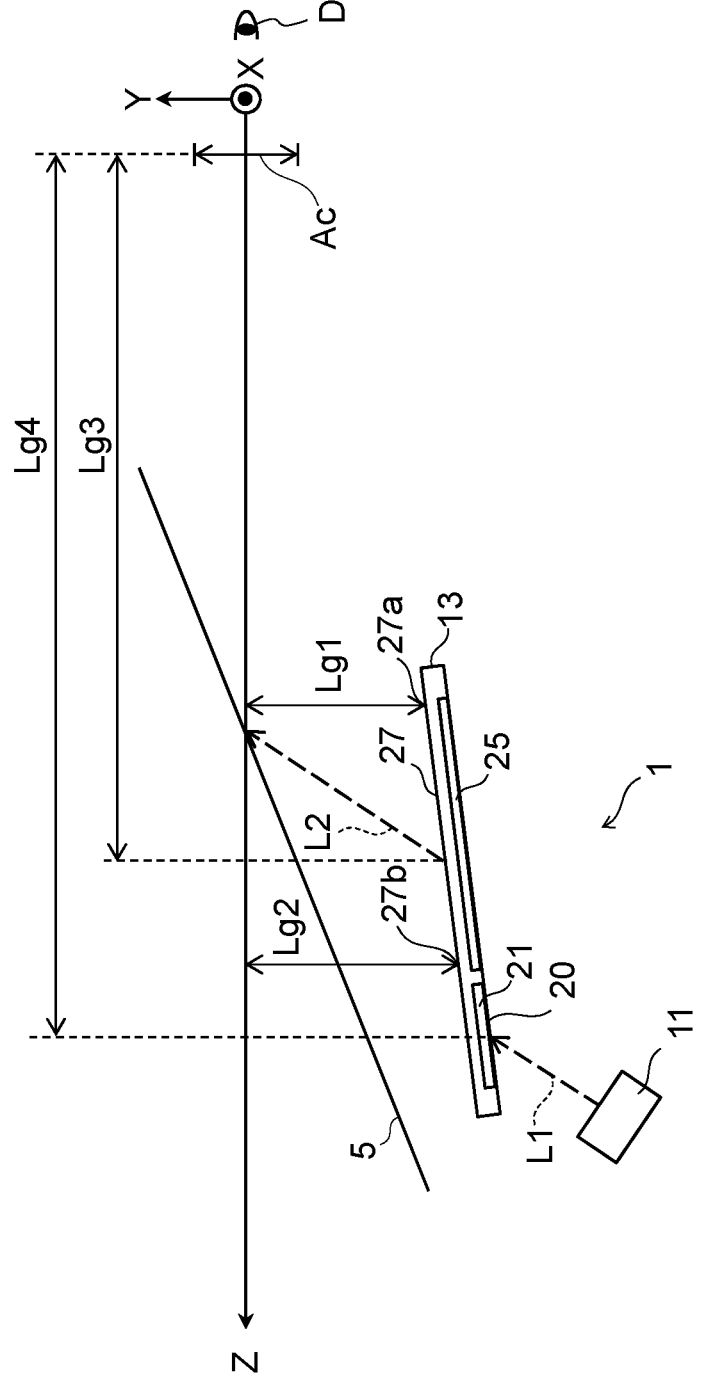
FIG. 7 is an explanatory view illustrating an optical path at the center of a light flux emitted from the display.

FIG. 7 will be referred to. When the Z-axis passes through the visual recognition region Ac of the virtual image Iv in the direction in which the observer D views the virtual image, the light guide body 13 is disposed below the visual recognition region Ac of the observer D. For example, a side of the light emission surface 27 of the light guide body 13 close to the observer D is close to the Z-axis, and a side of the light emission surface 27 far from the observer D is inclined in a direction away from the Z-axis in a cross-sectional view of the YZ plane. A distance Lg1 between a side 27a of the emission surface 27 on the observer side and the Z-axis is smaller than a distance Lg2 between a side 27b of the emission surface 27 on the display 11 side and the Z-axis. By inclining the light guide body 13 in this manner, sunlight incident on the light guide body 13 through the windshield 5 can be reflected toward the windshield 5. As a result, the sunlight reflected by the light guide body 13 does not reach the visual recognition region Ac, so that the observer D can be prevented from being dazzled. In addition, by adjusting the inclination angle of the light guide body 13, it is possible to prevent the observer D from being dazzled by the sunlight reflected by the light guide body 13 reaching the visual recognition region Ac after being reflected by the windshield 5.

The light guide body 13 is disposed so as to be inclined with respect to the Z-axis in the cross-sectional view of the YZ plane with respect to the windshield 5, and the light beam emitted from the light guide body 13 is incident on the windshield 5 so as to be inclined with respect to the Z-axis in the cross-sectional view of the YZ plane.

Since the light guide body 13 is disposed as described above, the light flux L1 from the display 11 obliquely is incident on the light guide body 13 to be divided and replicated, and the light flux L2 obliquely is emitted from the light guide body 13 toward the windshield 5.

Figure 8:
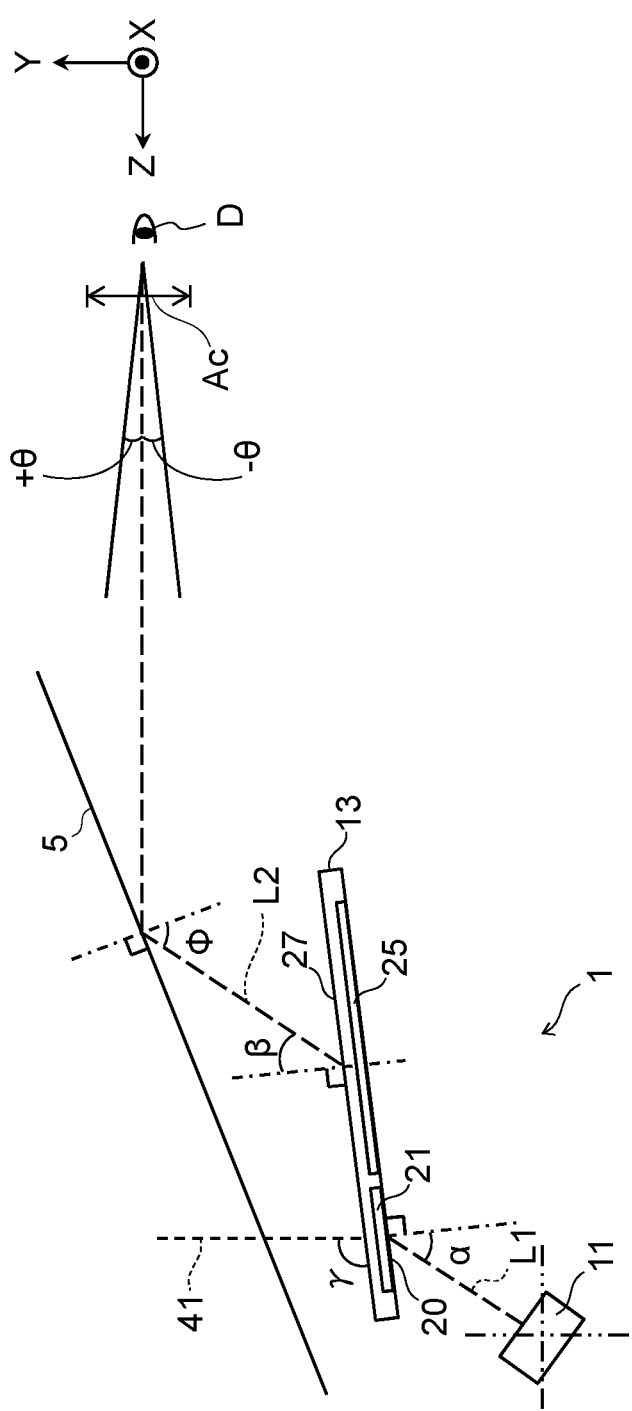
FIG. 8 is an explanatory view illustrating an optical path at the center of a light flux emitted from the display.

As illustrated in FIG. 8, when the angular range of the YZ plane in which the observer D visually recognizes the virtual image Iv is $+\theta$ degrees to $-\theta$ degrees about the Z-axis, either or both of the angular difference $\alpha$ between the incident light and the normal direction of the coupling region 21 of the light guide body 13 and the angular difference $\beta$ between the emission light and the normal direction of the emission surface 27 of the light guide body 13 are $\theta$ degrees to $90-\theta$ degrees on the YZ plane. If either or both of the angular difference $\alpha$ and the angular difference $\beta$ are less than $\theta$ degrees on the YZ plane, the possibility that stray light of sunlight is incident on the visual recognition region Ac increases, and if either or both of the angular difference $\alpha$ and the angular difference $\beta$ exceed $90-\theta$ degrees, it becomes difficult for the observer D to visually recognize the virtual image Iv. Therefore, if either or both of the angular difference $\alpha$ and the angular difference $\beta$ are in the angular range of $\theta$ degrees to $90-\theta$ degrees on the YZ plane, the possibility that the stray light of sunlight is incident on the visual recognition region Ac is reduced, and the observer D can appropriately visually recognize the virtual image Iv. The angle $\theta$ is, for example, 2 degrees to 3 degrees.

On the YZ plane, the incident angle $\Phi$ of the light flux L2 emitted from the light guide body 13 with respect to the windshield 5 is 45 degrees or more and 75 degrees or less, and the inclination angle $\gamma$ of the light guide body 13 with respect to the Y-axis is larger than the incident angle $\Phi$ of the light flux L2 on the windshield 5 and less than 175 degrees. In FIG. 8, a straight line denoted by reference numeral 41 is an imaginary straight line obtained by translating the Y-axis.

1-1-3. Pupil Expansion Order

Figure 9A:
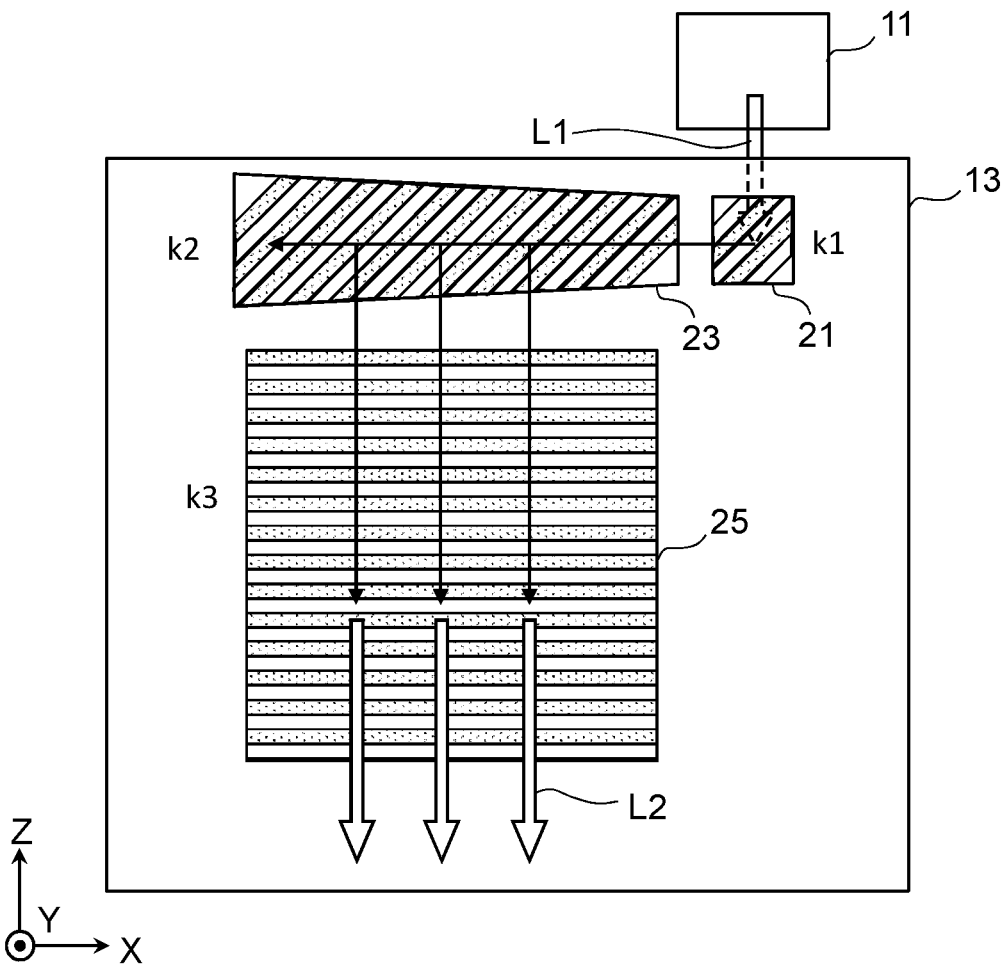
FIG. 9A is an explanatory view for explaining the order of pupil expansion of the light guide body of the embodiment.
Figure 9B:
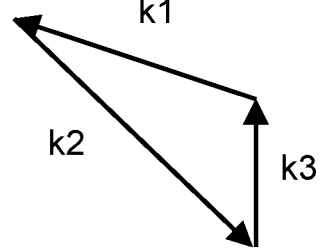
FIG. 9B is an explanatory view illustrating wave number vectors of the light guide body of the embodiment.

In the light guide body 13 having the above-described arrangement, unlike the HMD, in the HUD system 1, the magnitudes of the wave number vectors of the first expansion region 23 and the second expansion region 25 are different depending on the order of pupil expansion of the light flux L1 of the image light. First, the order of pupil expansion of the embodiment will be described with reference to FIGS. 9A and 9B. FIG. 9A is an explanatory view for explaining the order of pupil expansion of the light guide body 13 of the embodiment. FIG. 9B is an explanatory view illustrating wave number vectors of the light guide body 13 of the embodiment. Note that convex portions and concave portions of the diffraction grating are illustrated in each of the coupling region 21, the first expansion region 23, and the second expansion region 25 in FIG. 9A.

The light flux L1 of the image light incident on the light guide body 13 is changed in the propagation direction to the first expansion region 23 in which pupil expansion is performed in the horizontal direction (negative direction of the X-axis) as the first direction by the diffraction element formed in the coupling region 21. Therefore, the light flux L1 obliquely is incident on the coupling region 21, and then propagates in the direction of the first expansion region 23 under the action of the wave number vector k1 illustrated in FIG. 9B.

The light flux L1 propagating to the first expansion region 23 extending in the first direction is divided into the light flux L1 propagating in the first direction and the light flux L1 replicated and changed in the propagation direction to the second expansion region 25 by the diffraction element formed in the first expansion region 23 while repeating total reflection. At this time, the replicated light flux L1 propagates in the direction of the second expansion region 25 under the action of the wave number vector k2 illustrated in FIG. 9B.

The light flux L1 changed in the propagation direction to the second expansion region 25 extending along the negative direction of the Z-axis as the second direction is divided into the light flux L1 propagating in the second direction and the light flux L2 replicated and emitted from the second expansion region 25 to the outside of the light guide body 13 via the emission surface 27 by the diffraction element formed in the second expansion region 25. At this time, the replicated light flux L2 propagates in the direction of the emission surface 27 under the action of the wave number vector k3 illustrated in FIG. 9B.

Since the sum of each of the wave number vectors k1, k2, and k3 is 0, the direction of the light flux L1 incident on the light guide body 13 and the direction of the light flux L2 emitted from the light guide body 13 are the same direction. By performing pupil expansion in the first direction set in the horizontal direction and then performing pupil expansion in the second direction along the negative direction of the Z-axis, the magnitude of the wave number vector k3 of the second expansion region 25 can be reduced. Since the magnitude of the wave number vector k3 can be reduced, the diffraction power of the second expansion region 25 can be reduced, and the pitch in the diffraction grating of the second expansion region 25 can be made long. For example, the pitch in the diffraction grating of the coupling region 21 and the first expansion region 23 is about 300 nm, but the pitch in the diffraction grating of the second expansion region 25 can be about 1 μm. As a result, the pitch in the diffraction grating of the second expansion region 25 having the largest area in the region where the diffraction element is formed can be made long, and thus, the second expansion region 25 is easily processed. As a result, the light guide body 13 can be easily manufactured.

Figure 10A:
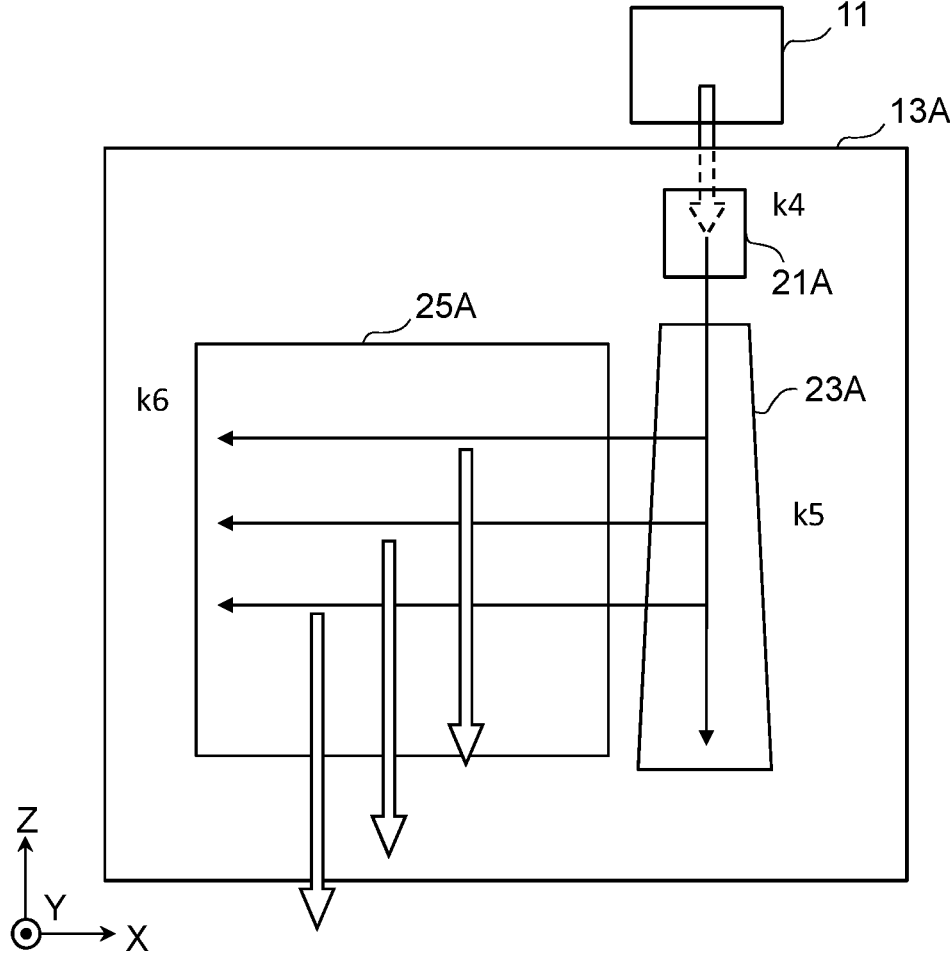
FIG. 10A is an explanatory view for explaining the order of pupil expansion of a light guide body of a comparative example.

FIG. 10A is an explanatory view for explaining the order of pupil expansion of the light guide body 13A as a comparative example. In the light guide body 13A of the comparative example, the light flux L1 of the image light incident on the display 11 is changed in the propagation direction to a first expansion region 23A that pupil-expands the virtual image Iv in the vertical direction by a diffraction element formed in a coupling region 21A. Therefore, the light flux L1 obliquely is incident on the coupling region

Figure 10B:
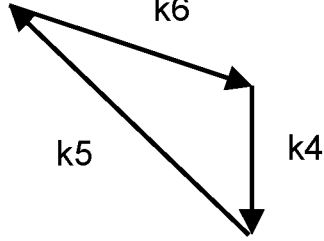
FIG. 10B is an explanatory view for explaining wave number vectors of the light guide body of the comparative example.

21A, and then propagates in the direction of the first expansion region 23 under the action of the wave number vector k4 illustrated in FIG. 10B.

The light flux L1 propagating to the first expansion region 23 extending along the Z-axis direction is divided into the light flux L1 propagating in the horizontal direction and the light flux L1 replicated and changed in the propagation direction to a second expansion region 25A by a diffraction element formed in a first expansion region 23A while repeating total reflection. At this time, the replicated light flux L1 propagates in the direction of the second expansion region 25 under the action of the wave number vector k illustrated in FIG. 10B.

The light flux L1 changed in the propagation direction to the second expansion region 25A extending in the horizontal direction is divided into the light flux L1 propagating in the negative direction of the X-axis and the light flux L2 replicated and emitted from the second expansion region 25A to the outside of the light guide body 13 via the emission surface 27 by the diffraction element formed in the second expansion region 25A. At this time, the replicated light flux L2 propagates in the direction of the emission surface 27 under the action of the wave number vector k6 illustrated in FIG. 10B.

In a case where pupil expansion is performed along the negative direction on the Z-axis and then expanded in the negative direction on the X-axis as in the comparative example, the magnitude of the wave number vector k6 of the second expansion region 25A is larger than that in the embodiment. Therefore, it is necessary to make the diffraction power of the second expansion region 25A of the comparative example larger than that of the embodiment, and it is necessary to shorten the pitch in the diffraction grating of the second expansion region 25A. For example, the pitch in the diffraction grating of the coupling region 21 is about 1 μm, but the pitch in the diffraction grating of the second expansion region 25 is about 300 nm. As a result, since it is necessary to shorten the pitch in the diffraction grating of the second expansion region 25A having the largest area in the region where the diffraction element is formed, it becomes more difficult to process the second expansion region 25A.

Figure 11:
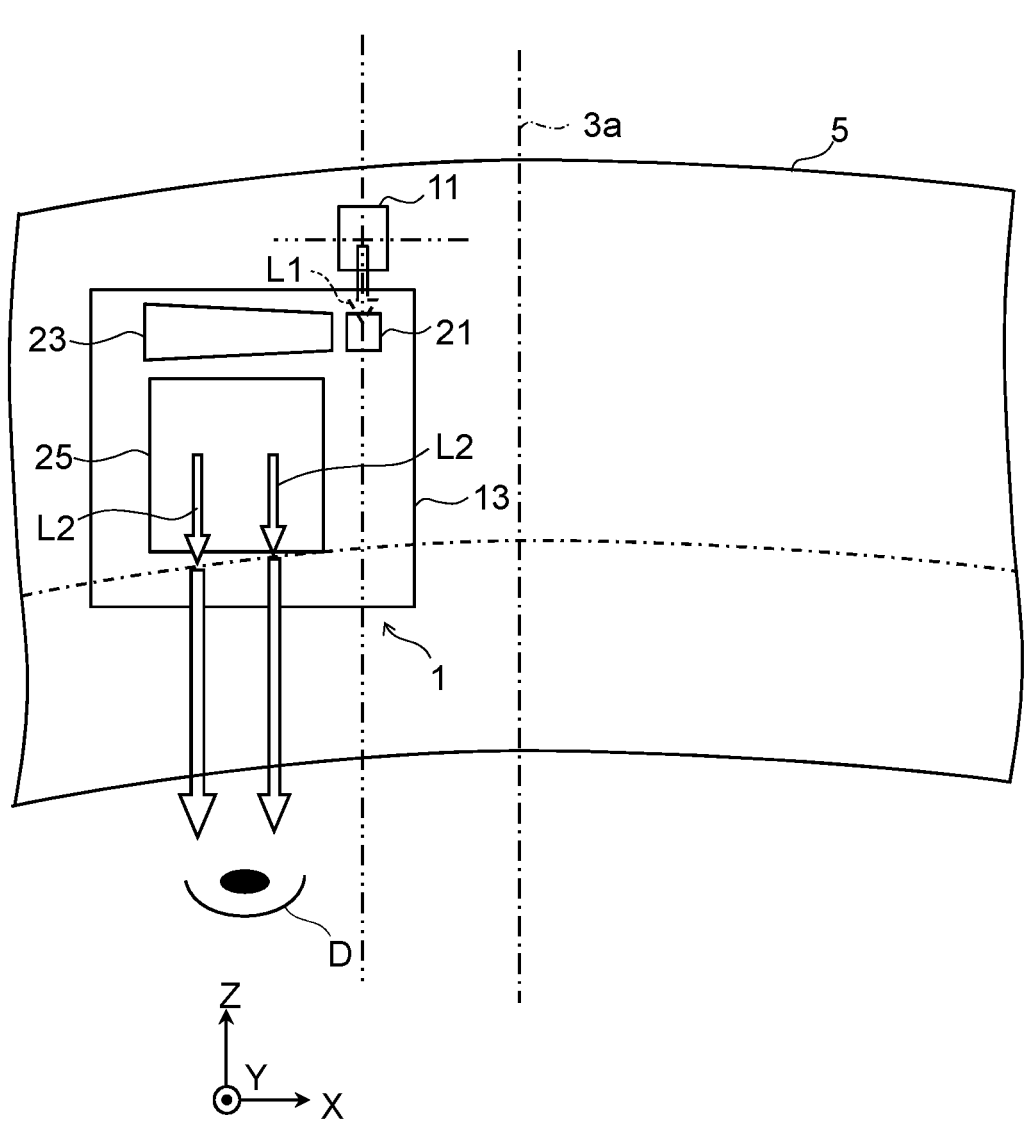
FIG. 11 is an XZ plane cross-sectional view of the vehicle on which the head-up display system is mounted.

As illustrated in FIG. 11, in the HUD system 1 of the embodiment, the display 11, the coupling region 21 of the light guide body 13, and the second expansion region 25 are disposed in this order in the negative direction of the Z-axis. Consequently, both the direction in which the light flux L1 is incident on the light guide body 13 from the display 11 and the direction in which the light flux L2 is emitted from the second expansion region 25 to the windshield 5 can have components in the same direction, so that the diffraction power of the second expansion region 25 can be reduced. In the embodiment, the direction in which the light flux L1 is incident on the light guide body 13 from the display 11 and the direction in which the light flux L2 is emitted from the second expansion region 25 to the windshield 5 are aligned along the negative direction of the Z-axis. The HUD system 1 of the embodiment is disposed on the left side with respect to a center line 3a in the width direction of the vehicle 3, but may be disposed on the right side. In addition, the display 11 and the coupling region 21 of the light guide body 13 may be disposed on the center line 3a side of the vehicle 3 with respect to the first expansion region 23 of the light guide body 13, or may be disposed on the opposite side.

In addition, as illustrated in FIGS. 8 and 11, the distance on the Z-axis from the visual recognition region Ac where the visual recognition position of the observer D is included in the region to the coupling region 21 is larger than the distance on the Z-axis from the visual recognition region Ac to the emission surface 27. Here, the distance on the Z-axis from the visual recognition region Ac to the coupling region 21 is a distance from the visual recognition region Ac to an intersection of a perpendicular line to the Z-axis from any point on the coupling region 21 on the YZ plane and the Z-axis. In addition, the distance on the Z-axis between the emission surface 27 and the visual recognition region Ac is a distance from the visual recognition region Ac to an intersection of a perpendicular line to the Z-axis from any point on the emission surface 27 on the YZ plane and the Z-axis. As a result, the difference between the incident angle of the light flux L1 on the light guide body 13 and the total reflection angle for guiding light inside the light guide body 13 is reduced, so that the diffraction pitch can be widened and the diffraction efficiency is increased.

The light flux emitted from the display 11 is emitted toward the quadrant in which the observer D is located with the display 11 as the center in either or both of the XZ plane formed by the X-axis and the Z-axis and the YZ plane. As a result, the difference between the incident angle of the light flux L1 on the light guide body 13 and the total reflection angle for guiding light inside the light guide body 13 is reduced, so that the diffraction pitch in the second expansion region 25 can be made long and the diffraction efficiency is increased. Thus, the light guide body 13 can be easily manufactured. The windshield 5 is a curved surface, and at least a part of a region where the light flux L2 is incident is inclined in a cross-sectional view of the XZ plane and a cross-sectional view of the YZ plane.

Figure 12:
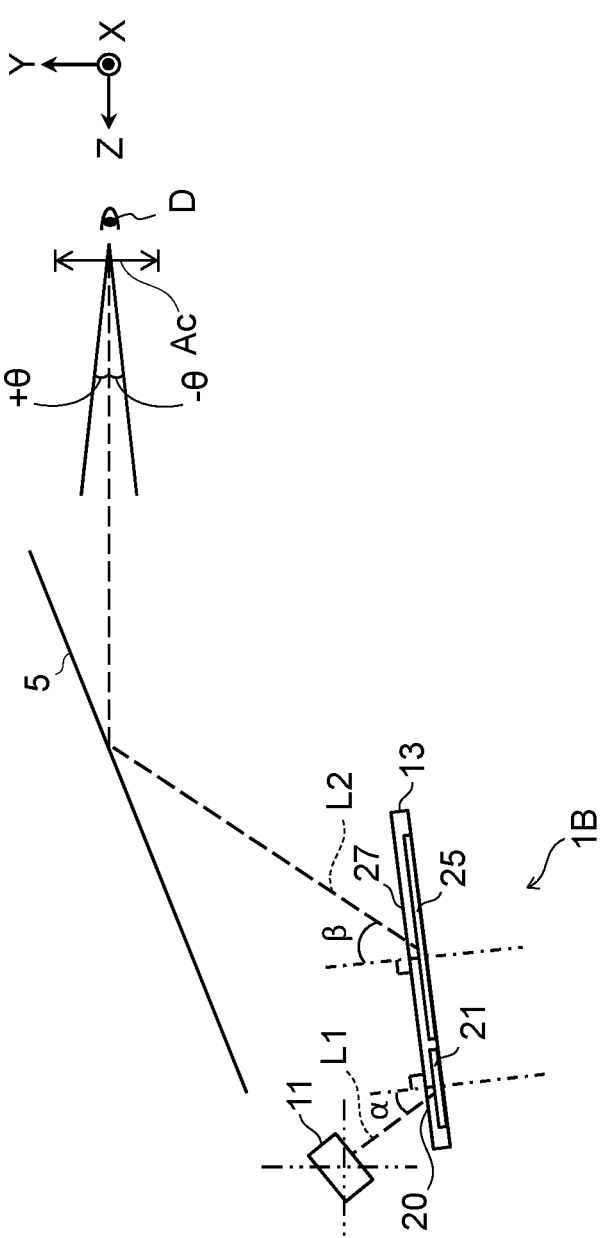
FIG. 12 is a YZ plane cross-sectional view of a vehicle, for illustrating a head-up display system of a modification.

As a modification of the embodiment, as illustrated in FIG. 12, in an HUD system 1B, an incident direction of a light flux L1 emitted from a display 11 on an incident surface 20 of a light guide body 13 may be different from an emission direction of a light flux L2 emitted from an emission surface 27. For example, the display 11 is disposed between the light guide body 13 and a windshield 5. Even in this case, the diffraction pitch in a second expansion region 25 can be made long, and furthermore, if the incident angle α of the light flux L1 on the incident surface 20 of the light guide body 13 and the emission angle β of the light flux L2 from the emission surface 27 are the same angle, the distortion of the image can be prevented, so that the optical design becomes easy.

Figure 13:
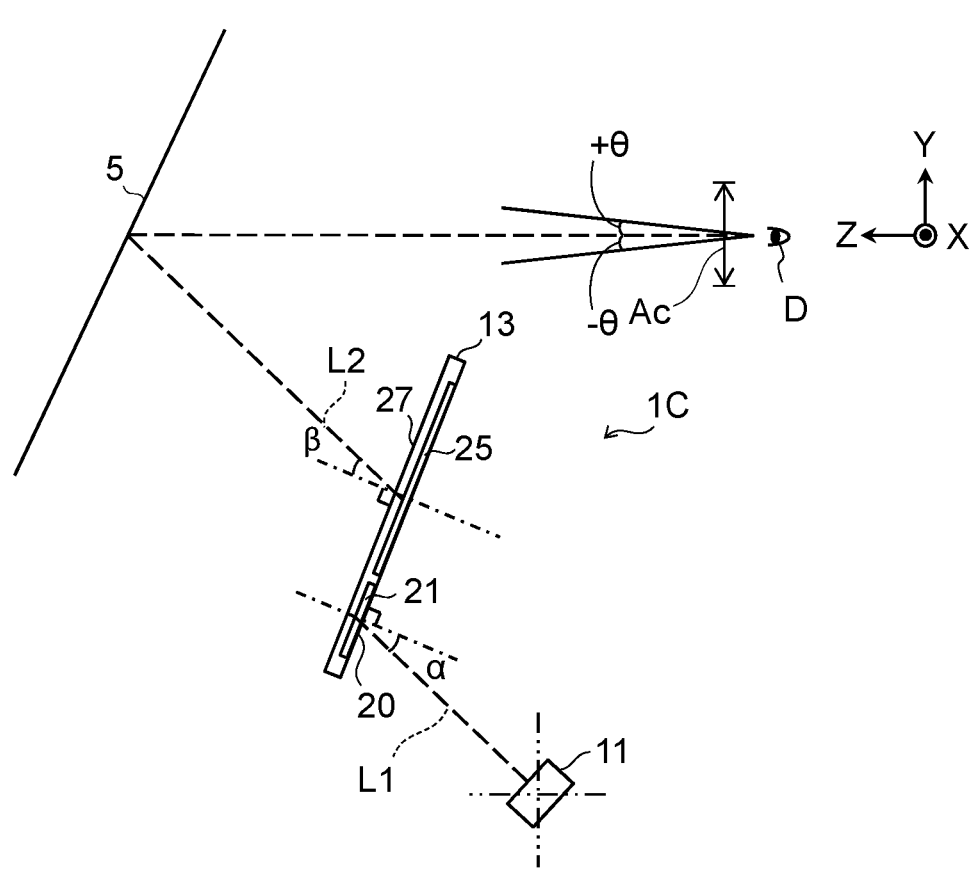
FIG. 13 is a YZ plane cross-sectional view of a vehicle, for illustrating a head-up display system of a modification.

As a modification of the embodiment, as illustrated in FIG. 13, also in an HUD system 1C, a light guide body 13 is disposed so as to be inclined with respect to a windshield 5 in a cross-sectional view of a YZ plane. In both an XZ plane and the YZ plane, a light flux L1 emitted from a display 11 is not emitted toward the quadrant in which an observer D is located with a display 11 as the center, but the diffraction pitch in a second expansion region 25 can be made long similarly to the embodiment, and an incident direction in which the light flux L1 emitted from the display 11 is incident on an incident surface 20 of a coupling region 21 of the light guide body 13 and an emission direction of a light flux L2 emitted from an emission surface 27 can be made the same direction.

Figure 14:
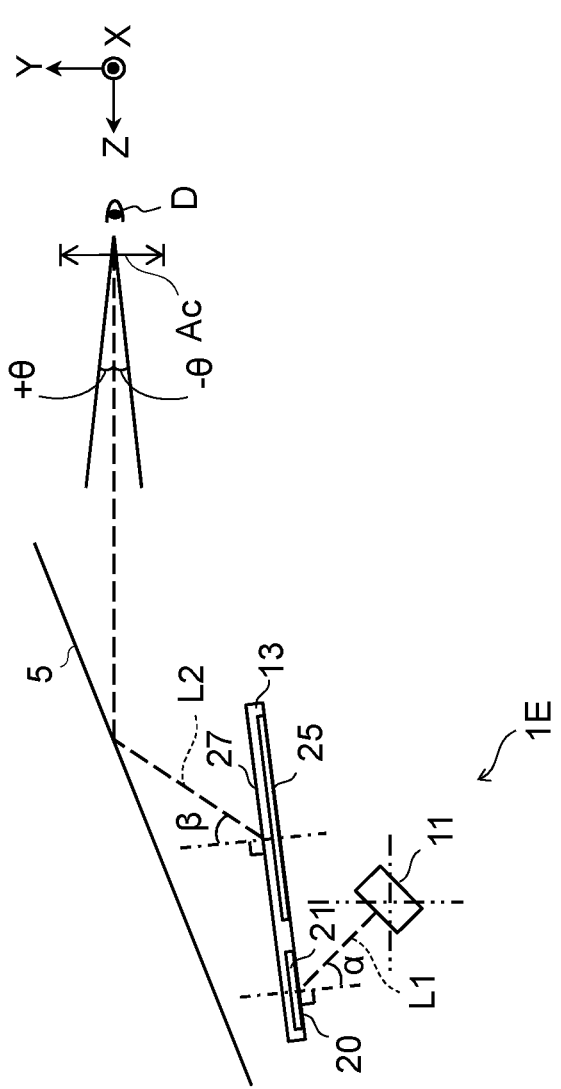
FIG. 14 is a YZ plane cross-sectional view of a vehicle, for illustrating a head-up display system of a modification.

As a modification of the embodiment, as illustrated in FIG. 14, in an HUD system 1E, for example, a display 11 may be disposed on a visual recognition region Ac side in the Z-axis direction with respect to a coupling region 21 of a light guide body 13. Even in this case, the diffraction pitch in a second expansion region 25 can be made long as in the embodiment.

Figure 15:
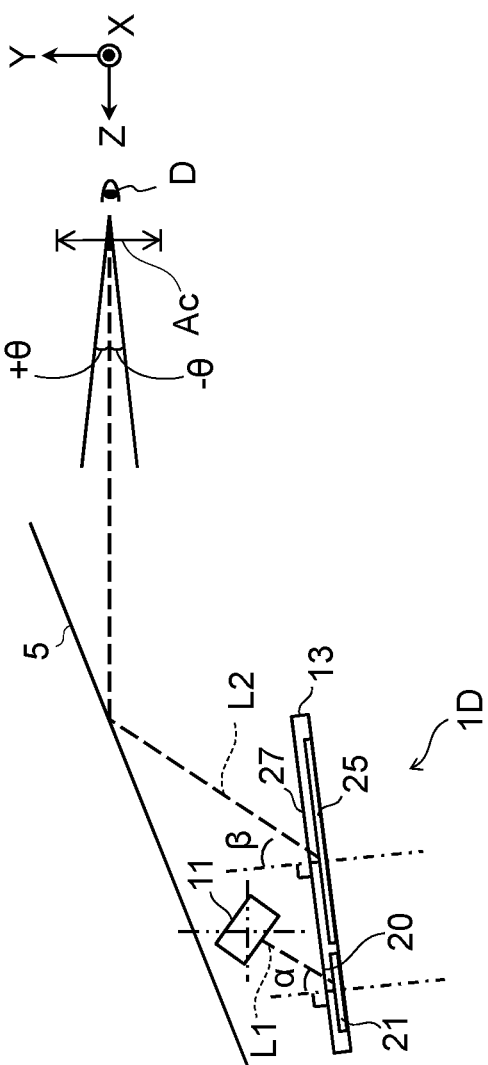
FIG. 15 is a YZ plane cross-sectional view of a vehicle, for illustrating a head-up display system of a modification.

As a modification of the embodiment, as illustrated in FIG. 15, in an HUD system 1D, for example, a display 11 may be disposed between a light guide body 13 and a windshield 5, and the display 11 may be disposed on a visual recognition region Ac side in the Z-axis direction with respect to a coupling region 21 of the light guide body 13. Even in this case, the diffraction pitch in a second expansion region 25 can be made long as in the embodiment.

1-2. Effects, Etc.

The HUD system 1 of the present disclosure is the HUD system 1 that displays the virtual image Iv so as to be superimposed on a real view visually recognizable through the windshield 5. The display 11 that emits a light flux visually recognized by the observer D as the virtual image Iv, and the light guide body 13 that guides the light flux to the windshield 5 are provided. The light guide body 13 includes the incident surface 20 on which the light flux from the display 11 is incident and the emission surface 27 from which the light flux is emitted from the light guide body 13. The light beam at the center of the light flux emitted from the display 11 is incident while being inclined with respect to the normal direction of the incident surface 20 of the light guide body 13. The direction in which the observer D visually recognizes the virtual image Iv from the visual recognition region Ac of the virtual image Iv is defined as the Z-axis direction, the horizontal direction orthogonal to the Z-axis is defined as the X-axis direction, and the direction orthogonal to the XZ plane formed by the X-axis and the Z-axis is defined as the Y-axis direction. The light flux incident on the incident surface 20 of the light guide body 13 is changed in the traveling direction in the light guide body 13, and is replicated into a plurality of light fluxes in the horizontal direction of the virtual image Iv visually recognized by the observer D, and then the replicated light fluxes are further replicated in the vertical direction to be emitted from the emission surface 27 so as to expand the visual recognition region. The light beam at the center of the light flux emitted from the light guide body 13 is emitted toward the windshield 5 while being inclined with respect to the normal direction of the emission surface 27 of the light guide body 13. The light guide body 13 is inclined with respect to the Z-axis in a cross-sectional view of the YZ plane formed by the Y-axis and the Z-axis. The light guide body 13 is disposed so as to be inclined in the cross-sectional view of the YZ plane with respect to the windshield 5, and the light beam emitted from the light guide body 13 is incident on the windshield 5 so as to be inclined with respect to the Z-axis in the cross-sectional view of the YZ plane.

In the HUD system 1, the light flux from the display 11 is emitted while being inclined to the coupling region 21 of the light guide body 13, and the light flux pupil-expanded by the light guide body 13 is emitted while being inclined from the emission surface 27 toward the windshield 5. The light flux incident on the incident surface of the light guide body 13 and changed in the traveling direction is replicated in the horizontal direction of the virtual image Iv visually recognized by the observer D, and is then further replicated in the vertical direction to be emitted from the emission surface 27. Therefore, the diffraction power of the widest region of the light guide body 13 in which the light flux is replicated in the vertical direction can be reduced, so that the light guide body 13 is easily processed and the HUD system 1 is easily manufactured.

In addition, the light guide body 13 is disposed below the visual recognition region of the observer D, and the light guide body 13 is inclined in the cross-sectional view of the YZ plane such that the side of the emission surface 27 of the light guide body 13 closer to the observer D is closer to the Z-axis than the side farther from the visual recognition region Ac. Thus, the light guide body 13 is disposed so as to face the windshield 5, so that the sunlight incident through the windshield 5 can be reflected again toward the windshield 5 by the light guide body 13. As a result, it is possible to prevent the sunlight from being reflected by the light guide body 13 and guided to the visual recognition region Ac, and it is possible to prevent the observer from being dazzled by the sunlight. In addition, by adjusting the inclination angle of the light guide body 13, it is possible to prevent the observer D from being dazzled by the sunlight reflected by the light guide body 13 reaching the visual recognition region Ac after being reflected by the windshield 5.

In addition, the light guide body 13 includes the coupling region 21 that changes the traveling direction of the light flux incident on the incident surface 20, the first expansion region 23 that horizontally replicates the light flux changed in the traveling direction in the coupling region 21 in the light guide body 13, and the second expansion region 25 that replicates the light flux expanded in the first expansion region 23 in the direction intersecting the horizontal direction in the light guide body 13. The coupling region 21, the first expansion region 23, and the second expansion region 25 have different diffraction powers and diffraction angles, respectively. The light flux replicated in the second expansion region 25 is emitted from the emission surface 27. Thus, the diffraction power of the second expansion region 25 can be reduced, so that the light guide body 13 can be easily manufactured.

The coupling region 21, the first expansion region 23, and the second expansion region 25 are regions having a diffraction structure, and have different magnitudes of wave number vectors of the respective diffraction structures. For example, the wave number vector k2 of the first expansion region 23 is about 1.1 times the wave number vector k1 of the coupling region 21, and the wave number vector k3 of the second expansion region 25 is about 0.3 times the wave number vector k1 of the coupling region 21. Since the diffraction pitch in the diffraction structure of the second expansion region 25 can be made long, the light guide body 13 can be easily manufactured.

Further, by projecting light emitted from the HID system 1 onto the windshield 5 of the vehicle 3, the virtual image Iv suitable for the observer D who drives the vehicle 3 can be displayed.

Other Embodiments

As described above, the embodiment has been described as an example of the technology disclosed in the present application. However, the technology in the present disclosure is not limited to this, and is applicable to embodiments in which changes, replacements, additions, omissions, and the like are appropriately made. Thus, in the following, other embodiments will be exemplified.

In the above embodiment, the virtual image Iv is visually recognized by the observer D by reflecting the divided and replicated light flux L2 on the windshield 5, but the present invention is not limited thereto. The virtual image Iv may be visually recognized by the observer D by reflecting the divided and replicated light flux L2 on a combiner using the combiner instead of the windshield 5.

Figure 16:
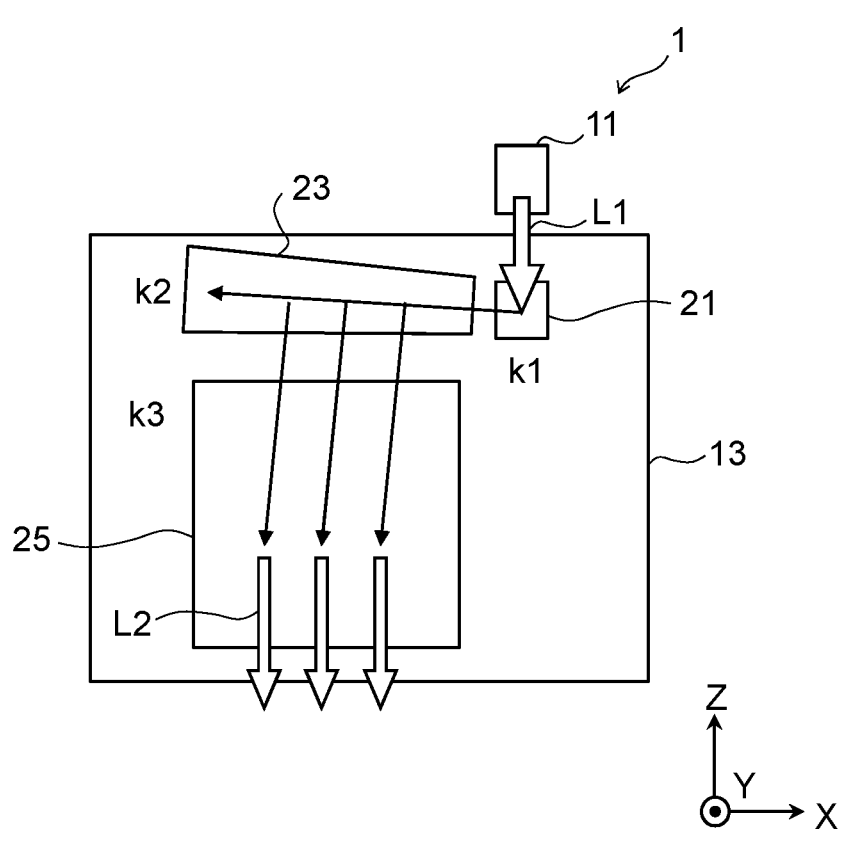
FIG. 16 is an explanatory view illustrating a head-up display system of a modification.

In the above embodiment, the first direction in which the light flux L1 is expanded in the first expansion region 23 and the second direction in which the light flux L1 is expanded in the second expansion region 25 are orthogonal to each other, but the present invention is not limited thereto. As illustrated in FIG. 16, in expanding the light flux L1 in the first direction in the first expansion region 23, a component expanding in the horizontal direction only needs to be larger than that in the direction along the Z-axis, and in expanding the light flux L1 in the second direction in the second expansion region 25, a component expanding in the direction along the Z-axis only needs to be larger than that expanding in the horizontal direction.

In the above embodiment, the case where the HUD system 1 is applied to the vehicle 3 such as an automobile has been described. However, the object to which the HUD system 1 is applied is not limited to the vehicle 3. The object to which the HUD system 1 is applied may be, for example, a train, a motorcycle, a ship, or an aircraft, or an amusement machine without movement. In the case of an amusement machine, the light flux from the display 11 is reflected by a transparent curved plate as a light-transmitting member that reflects the light flux emitted from the display 11 instead of the windshield 5. Further, the real view visually recognizable by a user through the transparent music plate may be a video displayed from another video display. That is, a virtual image by the HUD system 1 may be displayed so as to be superimposed on a video displayed from another video display. As described above, any one of the windshield 5, the combiner, and the transparent curved plate may be adopted as the light-transmitting member in the present disclosure.

Outline of Embodiments (1) A head-up display system of the present disclosure is a head-up display system that displays a virtual image so as to be superimposed on a real view visually recognizable through a light-transmitting member, and includes: a display that emits a light flux visually recognized by an observer as the virtual image; and a light guide body that guides the light flux to the light-transmitting member. The light guide body includes an incident surface on which the light flux from the display is incident and an emission surface from which the light flux is emitted from the light guide body. A light beam at a center of the light flux emitted from the display is incident while being inclined with respect to a normal direction of the incident surface of the light guide body. When a direction in which the observer visually recognizes the virtual image from a visual recognition region of the virtual image is a Z-axis direction, a horizontal direction orthogonal to the Z-axis is an X-axis direction, and a direction orthogonal to an XZ plane formed by the X-axis and the Z-axis is a Y-axis direction, the light flux incident on the incident surface of the light guide body is changed in a traveling direction in the light guide body, the light flux is replicated into a plurality of light fluxes in a horizontal direction of the virtual image visually recognized by the observer, and then the replicated light fluxes are further replicated in a vertical direction of the virtual image to be emitted from the emission surface so as to expand the visual recognition region. A light beam at a center of the light fluxes emitted from the light guide body is emitted toward the light-transmitting member while being inclined with respect to a normal direction of the emission surface of the light guide body. The light guide body is inclined with respect to the Z-axis in a cross-sectional view of a YZ plane formed by the Y-axis and the Z-axis, and the light guide body is disposed so as to be inclined with respect to the light-transmitting member in a cross-sectional view of the YZ plane. A light flux emitted from the light guide body is incident on the light-transmitting member so as to be inclined with respect to the Z-axis in a cross-sectional view of the YZ plane.

As a result, the light flux from the display is incident on the incident surface of the light guide body while being inclined, and the light flux pupil-expanded by the light guide body is emitted toward the windshield while being inclined from the emission surface. The light flux incident on the incident surface of the light guide body and changed in the traveling direction is replicated in the horizontal direction (lateral direction) of the virtual image visually recognized by the observer, and is then further replicated into a plurality of light fluxes in the vertical direction (longitudinal direction) to be emitted from the emission surface. Therefore, the diffraction power of the widest region of the light guide body in which the light flux is replicated in the vertical direction (longitudinal direction) can be reduced, so that the diffraction grating or the volume hologram in this region of the light guide body is easily processed, and the head-up display system is easily manufactured.

(2) In the head-up display system of (1), a distance on the Z-axis from the visual recognition region to the incident surface is larger than a distance on the Z-axis from the visual recognition region to the emission surface.

(3) In the head-up display system of (1) or (2), the light guide body is disposed below the visual recognition region of the observer, and the light guide body is inclined in a cross-sectional view of the YZ plane such that a side of the emission surface of the light guide body closer to the visual recognition region is closer to the Z-axis than aside of the emission surface farther from the visual recognition region.

(4) In the head-up display system of any one of (1) to (3), an incident angle of a light flux emitted from the light guide body with respect to the light-transmitting member on the YZ plane is 45 degrees or more and 75 degrees or less, and an inclination angle of the light guide body with respect to the Y-axis is larger than an incident angle of the light flux on the light-transmitting member and smaller than 175 degrees.

(5) In the head-up display system of any one of (1) to (4), a light flux emitted from the display is emitted toward a quadrant in which the visual recognition region exists with the display as a center in either or both of the XZ plane and the YZ plane.

(6) In the head-up display system of any one of (1) to (5), when an angular range in which the observer visually recognizes the virtual image on the YZ plane is +θ degrees to −θ degrees about the Z-axis, either or both of an angular difference between incident light incident on the incident surface of the light guide body and the normal direction of the incident surface of the light guide body and an angular difference between emission light emitted from the emission surface of the light guide body and the normal direction of the emission surface of the light guide body are θ degrees to 90−θ degrees in a YZ plane.

(7) In the head-up display system of any one of (1) to (6), the light-transmitting member has a curved surface, and at least a part of a region where a light flux emitted from the light guide body is incident is inclined in a cross-sectional view of the XZ plane and a cross-sectional view of the YZ plane.

(8) In the head-up display system of any one of (1) to (7), the light guide body includes a coupling region that changes a traveling direction of a light flux incident on the incident surface, a first expansion region that replicates the light flux changed in the traveling direction in the coupling region in the horizontal direction in the light guide body, and a second expansion region that replicates the light flux replicated in the first expansion region in a direction intersecting the horizontal direction in the light guide body. The coupling region, the first expansion region, and the second expansion region have different diffraction powers and diffraction angles, respectively, and the light flux duplicated in the second expansion region is emitted from the emission surface.

(9) In the head-up display system of (8), at least one of the coupling region, the first expansion region, and the second expansion region includes a volume hologram.

(10) In the head-up display system of (8), the coupling region, the first expansion region, and the second expansion region are regions having diffraction structures, and have different magnitudes of wave number vectors of the respective diffraction structures.

(11) In the head-up display system of any one of (8) to (10), in the first expansion region, a length in a direction in which the light flux emitted from the coupling region is incident on and expanded by the first expansion region is larger than a length in a direction in which the light flux emitted from the first expansion region is incident on and expanded by the second expansion region.

(12) In the head-up display system of any one of (1) to (11), the light-transmitting member is a windshield of a moving body. Thus, the present invention can be applied as a head-up display system of a moving body.

(13) A head-up display system of the present disclosure is a head-up display system that displays a virtual image so as to be superimposed on a real view visually recognizable through a light-transmitting member, and includes: a display that emits a light flux visually recognized by an observer as the virtual image; and a light guide body that guides the light flux to the light-transmitting member. The light guide body includes an incident surface on which the light flux from the display is incident, a coupling region that changes a traveling direction of the light flux incident on the incident surface, a first expansion region that expands a visual recognition region by replicating the light flux propagated from the coupling region into a plurality of light fluxes in a first direction, a second expansion region that expands the visual recognition region by replicating the light fluxes replicated in the first expansion region in a second direction intersecting the first direction, and an emission surface from which the light fluxes replicated in the second expansion region are emitted. A light beam at a center of the light flux emitted from the display is incident while being inclined with respect to a normal direction of the incident surface of the light guide body. When a direction in which the observer visually recognizes the virtual image from the visual recognition region of the virtual image is a Z-axis direction, a horizontal direction orthogonal to the Z-axis is an X-axis direction, and a direction orthogonal to an XZ plane formed by the X-axis and the Z-axis is a Y-axis direction, in the light guide body, the light flux incident on the coupling region and changed in the traveling direction propagates to the first expansion region, is replicated in the first direction that is the horizontal direction, and propagates to the second expansion region, and is replicated in the second direction in the second expansion region and is emitted from the emission surface. A light beam at a center of the light fluxes emitted from the light guide body is emitted toward the light-transmitting member while being inclined with respect to a normal direction of the emission surface of the light guide body. The light guide body is inclined with respect to the Z-axis in a cross-sectional view of a YZ plane formed by the Y-axis and the Z-axis, and the light guide body is disposed so as to be inclined with respect to the light-transmitting member in a cross-sectional view of the YZ plane. A light flux emitted from the light guide body is incident on the light-transmitting member so as to be inclined with respect to the Z-axis in a cross-sectional view of the YZ plane.

The present disclosure is applicable to a head-up display system that displays a virtual image in front of a light-transmitting member.

EXPLANATIONS OF LETTERS OR NUMERALS 1 head-up display system
3 vehicle
3a center line
5 windshield
11 display
13, 13A light guide body
13a first main surface
13b second main surface
15 controller
17 storage
20 incident surface
21, 21A coupling region
23, 23A first expansion region
23p point
25, 25A second expansion region
25p point
27 emission surface
Ac visual recognition region
D observer
Iv virtual image
k1, k2, k3 wave number vector
L1, L2 light flux
α, β angular difference

What is claimed is:

1. A head-up display system that displays a virtual image so as to be superimposed on a real view visually recognizable through a light-transmitting member, the head-up display system comprising:

a display that emits a light flux visually recognized by an observer as the virtual image; and a light guide body that is disposed apart from the light-transmitting member and projects the light flux to the light-transmitting member, wherein the light guide body includes an incident surface on which the light flux from the display is incident and an emission surface from which the light flux is emitted from the light guide body, wherein a light beam at a center of the light flux emitted from the display is incident while being inclined with respect to a normal direction of the incident surface of the light guide body, wherein, when a direction in which the observer visually recognizes the virtual image from a visual recognition region of the virtual image is a Z-axis, a horizontal direction orthogonal to the Z-axis is an X-axis, and a direction orthogonal to an XZ plane formed by the X-axis and the Z-axis is a Y-axis, the light flux incident on the incident surface of the light guide body is changed in a traveling direction in the light guide body, the light flux is replicated into a plurality of light fluxes in a horizontal direction of the virtual image visually recognized by the observer, and then the replicated light fluxes are further replicated in a vertical direction of the virtual image to be emitted from the emission surface so as to expand the visual recognition region, wherein the light guide body is inclined with respect to the Z-axis in a cross-sectional view of a YZ plane formed by the Y-axis and the Z-axis, and wherein the light guide body is disposed so as to be inclined with respect to the light-transmitting member in a cross-sectional view of the YZ plane, and a light beam at a center of the light fluxes emitted from the light guide body is emitted toward the light-transmitting member at an angle inclined toward the visual recognition region relative to an axis perpendicular to the emission surface of the light guide body in a cross-sectional view of the YZ plane.

2. The head-up display system according to claim 1, wherein a distance on the Z-axis from the visual recognition region to the incident surface is larger than a distance on the Z-axis from the visual recognition region to the emission surface.

3. The head-up display system according to claim 2, wherein the light guide body is disposed below the visual recognition region of the observer, and wherein the light guide body is inclined in a cross-sectional view of the YZ plane such that a side of the emission surface of the light guide body closer to the visual recognition region is closer to the Z-axis than a side of the emission surface farther from the visual recognition region.

4. The head-up display system according to claim 2, wherein an incident angle of a light flux emitted from the light guide body with respect to the light-transmitting member on the YZ plane is 45 degrees or more and 75 degrees or less, and wherein an inclination angle of the light guide body with respect to the Y-axis is larger than an incident angle of the light flux on the light-transmitting member and less than 175 degrees.

5. The head-up display system according to claim 2, wherein a light flux emitted from the display is emitted toward a quadrant in which the visual recognition region exists with the display as a center in either or both of the XZ plane and the YZ plane.

6. The head-up display system according to claim 2, wherein, when an angular range in which the observer visually recognizes the virtual image on the YZ plane is +θ degrees to −θ degrees about the Z-axis, either or both of an angular difference between incident light incident on the incident surface of the light guide body and the normal direction of the incident surface of the light guide body and an angular difference between emission light emitted from the emission surface of the light guide body and the normal direction of the emission surface of the light guide body are θ degrees to 90−θ degrees on a YZ plane.

7. The head-up display system according to claim 1, wherein the light guide body is disposed below the visual recognition region of the observer, and wherein the light guide body is inclined with respect to the Z-axis in the cross-sectional view of the YZ plane such that a side of the emission surface of the light guide body closer to the visual recognition region is closer to the Z-axis than a side of the emission surface farther from the visual recognition region.

8. The head-up display system according to claim 7, wherein an incident angle of a light flux emitted from the light guide body with respect to the light-transmitting member on the YZ plane is 45 degrees or more and 75 degrees or less, and wherein an inclination angle of the light guide body with respect to the Y-axis is larger than an incident angle of the light flux on the light-transmitting member and less than 175 degrees.

9. The head-up display system according to claim 7, wherein a light flux emitted from the display is emitted toward a quadrant in which the visual recognition region exists with the display as a center in either or both of the XZ plane and the YZ plane.

10. The head-up display system according to claim 1, wherein an incident angle of the light flux emitted from the light guide body with respect to the light-transmitting member on the YZ plane is 45 degrees or more and 75 degrees or less, and wherein an inclination angle of the light guide body with respect to the Y-axis is larger than the incident angle of the light flux on the light-transmitting member and less than 175 degrees.

11. The head-up display system according to claim 10, wherein a light flux emitted from the display is emitted toward a quadrant in which the visual recognition region exists with the display as a center in either or both of the XZ plane and the YZ plane.

12. The head-up display system according to claim 1, wherein the light flux emitted from the display is emitted toward a quadrant in which the visual recognition region exists with the display as a center in either or both of the XZ plane and the YZ plane.

13. The head-up display system according to claim 1, wherein, when an angular range in which the observer visually recognizes the virtual image on the YZ plane is $+\theta$ degrees to $-\theta$ degrees about the Z-axis, either or both of an angular difference between incident light incident on the incident surface of the light guide body and the normal direction of the incident surface of the light guide body and an angular difference between emission light emitted from the emission surface of the light guide body and the normal direction of the emission surface of the light guide body are $\theta$ degrees to $90-\theta$ degrees on a YZ plane.

14. The head-up display system according to claim 1, wherein the light-transmitting member has a curved surface, and a part of a region where the light flux emitted from the light guide body is incident is inclined in a cross-sectional view of the XZ plane and a cross-sectional view of the YZ plane.

15. The head-up display system according to claim 1, wherein the light guide body includes a coupling region that changes a traveling direction of the light flux incident on the incident surface, a first expansion region that replicates the light flux changed in the traveling direction in the coupling region in the horizontal direction in the light guide body, and a second expansion region that replicates the light flux replicated in the first expansion region in a direction intersecting the horizontal direction in the light guide body, wherein the coupling region, the first expansion region, and the second expansion region have different diffraction powers and diffraction angles, respectively, and wherein the light flux replicated in the second expansion region is emitted from the emission surface.

16. The head-up display system according to claim 15, wherein at least one of the coupling region, the first expansion region, and the second expansion region includes a volume hologram.

17. The head-up display system according to claim 15, wherein the coupling region, the first expansion region, and the second expansion region are regions having diffraction structures, and have different magnitudes of wave number vectors of the respective diffraction structures.

18. The head-up display system according to claim 15, wherein, in the first expansion region, a length in a direction in which the light flux emitted from the coupling region is incident on and expanded by the first expansion region is larger than a length in a direction in which the light flux emitted from the first expansion region is incident on and expanded by the second expansion region.

19. The head-up display system according to claim 1, wherein the light-transmitting member is a windshield of a moving body.

20. A head-up display system that displays a virtual image so as to be superimposed on a real view visually recognizable through a light-transmitting member, the head-up display system comprising:

a display that emits a light flux visually recognized by an observer as the virtual image; and a light guide body that is disposed apart from the light-transmitting member and projects the light flux to the light-transmitting member, wherein the light guide body includes an incident surface on which the light flux from the display is incident, a coupling region that changes a traveling direction of the light flux incident on the incident surface, a first expansion region that expands a visual recognition region by replicating the light flux propagated from the coupling region into a plurality of light fluxes in a first direction, a second expansion region that expands the visual recognition region by replicating the light fluxes replicated in the first expansion region in a second direction intersecting the first direction, and an emission surface from which the light fluxes replicated in the second expansion region are emitted, wherein a light beam at a center of the light flux emitted from the display is incident while being inclined with respect to a normal direction of the incident surface of the light guide body, wherein, when a direction in which the observer visually recognizes the virtual image from the visual recognition region of the virtual image is a Z-axis, a horizontal direction orthogonal to the Z-axis is an X-axis, and a direction orthogonal to an XZ plane formed by the X-axis and the Z-axis is a Y-axis, in the light guide body, the light flux incident on the coupling region and changed in the traveling direction propagates to the first expansion region, is replicated in the first direction that is the horizontal direction, and propagates to the second expansion region, and is replicated in the second direction in the second expansion region and is emitted from the emission surface, wherein the light guide body is inclined with respect to the Z-axis in a cross-sectional view of a YZ plane formed by the Y-axis and the Z-axis, and wherein the light guide body is disposed so as to be inclined with respect to the light-transmitting member in a cross-sectional view of the YZ plane, and a light beam at a center of the light fluxes emitted from the light guide body is emitted toward the light-transmitting member at an angle inclined toward the visual recognition region relative to an axis perpendicular to the emission surface of the light guide body in a cross-sectional view of the YZ plane.

* * * * *